United States Patent
Matsuno et al.

(10) Patent No.: US 10,559,822 B2
(45) Date of Patent: Feb. 11, 2020

(54) NEGATIVE ELECTRODE ACTIVE MATERIAL, MIXED NEGATIVE ELECTRODE ACTIVE MATERIAL, NEGATIVE ELECTRODE FOR NON-AQUEOUS ELECTROLYTE SECONDARY BATTERY, LITHIUM ION SECONDARY BATTERY, METHOD FOR PRODUCING NEGATIVE ELECTRODE ACTIVE MATERIAL, AND METHOD FOR PRODUCING LITHIUM ION SECONDARY BATTERY

(71) Applicant: SHIN-ETSU CHEMICAL CO., LTD., Tokyo (JP)

(72) Inventors: Takumi Matsuno, Annaka (JP);
Takakazu Hirose, Annaka (JP);
Hiromichi Kamo, Takasaki (JP);
Masahiro Furuya, Takasaki (JP);
Hidekazu Awano, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 116 days.

(21) Appl. No.: 15/768,931

(22) PCT Filed: Oct. 27, 2016

(86) PCT No.: PCT/JP2016/004713
§ 371 (c)(1),
(2) Date: Apr. 17, 2018

(87) PCT Pub. No.: WO2017/085906
PCT Pub. Date: May 26, 2017

(65) Prior Publication Data
US 2019/0058189 A1     Feb. 21, 2019

(30) Foreign Application Priority Data

Nov. 17, 2015 (JP) .................................. 2015-225179

(51) Int. Cl.
*H01M 10/0525* (2010.01)
*H01M 4/131* (2010.01)
(Continued)

(52) U.S. Cl.
CPC .......... *H01M 4/485* (2013.01); *H01M 4/131* (2013.01); *H01M 4/133* (2013.01); *H01M 4/364* (2013.01);
(Continued)

(58) Field of Classification Search
None
See application file for complete search history.

(56) References Cited

U.S. PATENT DOCUMENTS

| 5,395,711 A | 3/1995 | Tahara et al. |
| 7,459,236 B2 | 12/2008 | Konishiike et al. |

(Continued)

FOREIGN PATENT DOCUMENTS

| JP | 2997741 B2 | 1/2000 |
| JP | 2001-148241 A | 5/2001 |

(Continued)

OTHER PUBLICATIONS

Jan. 10, 2017 Search Report issued in International Patent Application No. PCT/JP2016/004713.

*Primary Examiner* — Yoshitoshi Takeuchi
(74) *Attorney, Agent, or Firm* — Oliff PLC (57) ABSTRACT

A negative electrode active material, wherein the negative electrode active material is a negative electrode active material including negative electrode active material particles; the negative electrode active material particles include silicon compound particles including a silicon compound ($SiO_x$: $0.5 \leq x \leq 1.6$); the silicon compound particles include at least any one kind or more kinds of $Li_2SiO_3$ and $Li_4SiO_4$; the negative electrode active material particles (Continued)

have a loose bulk density BD of 0.5 g/cm$^3$ or more and 0.9 g/cm$^3$ or less, a tapped bulk density TD of 0.7 g/cm$^3$ or more and 1.2 g/cm$^3$ or less, and a compression degree of 25% or less, the compression degree being defined by (TD−BD)/TD. Therefore, the negative electrode active material which is capable of improving the initial charge and discharge characteristics as well as the cycle characteristics upon using it as the negative electrode active material of a secondary battery is provided.

15 Claims, 2 Drawing Sheets (51) Int. Cl.
| | |
|---|---|
| *H01M 4/36* | (2006.01) |
| *H01M 4/485* | (2010.01) |
| *H01M 4/48* | (2010.01) |
| *H01M 4/58* | (2010.01) |
| *H01M 4/66* | (2006.01) |
| *H01M 4/133* | (2010.01) |
| *H01M 10/44* | (2006.01) |
| *H01M 4/587* | (2010.01) |
| *H01M 4/02* | (2006.01) |

(52) U.S. Cl.
CPC ........... *H01M 4/366* (2013.01); *H01M 4/587* (2013.01); *H01M 4/66* (2013.01); *H01M 10/0525* (2013.01); *H01M 10/44* (2013.01); *H01M 2004/027* (2013.01)

(56) References Cited

U.S. PATENT DOCUMENTS

| | | | |
|---|---|---|---|
| 8,377,592 | B2 | 2/2013 | Jeong et al. |
| 2006/0099507 | A1 | 5/2006 | Kogetsu et al. |
| 2007/0190416 | A1 | 8/2007 | Yamada et al. |
| 2008/0176137 | A1 | 7/2008 | Endo et al. |
| 2009/0202911 | A1 | 8/2009 | Fukuoka et al. |
| 2013/0011726 | A1* | 1/2013 | Takano .............. C01G 45/1228 429/188 |
| 2015/0372294 | A1 | 12/2015 | Minami et al. |

FOREIGN PATENT DOCUMENTS

| | | |
|---|---|---|
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2007-242590 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2013-143297 A | 7/2013 |
| JP | 2013-200961 A | 10/2013 |
| JP | 2014-82118 A | 5/2014 |
| JP | 2014-103019 A | 6/2014 |
| WO | 2014/119256 A1 | 8/2014 |
| WO | 2015/146857 A1 | 10/2015 |

* cited by examiner

NEGATIVE ELECTRODE ACTIVE MATERIAL, MIXED NEGATIVE ELECTRODE ACTIVE MATERIAL, NEGATIVE ELECTRODE FOR NON-AQUEOUS ELECTROLYTE SECONDARY BATTERY, LITHIUM ION SECONDARY BATTERY, METHOD FOR PRODUCING NEGATIVE ELECTRODE ACTIVE MATERIAL, AND METHOD FOR PRODUCING LITHIUM ION SECONDARY BATTERY

TECHNICAL FIELD

Present invention relates to a negative electrode active material, a mixed negative electrode active material, a negative electrode for a non-aqueous electrolyte secondary battery, a lithium ion secondary battery, a method for producing a negative electrode active material, and a method for producing a lithium ion secondary battery.

BACKGROUND ART

In recent years, small electronic equipment represented by a mobile terminal is widely used, whereby further downsizing, reduction in the weight, and prolonged life are strongly requested. To meet the market needs as mentioned above, a secondary battery which can especially achieve downsizing, reduction in the weight, and high energy density is being developed. This secondary battery is being investigated for application not only to small electronic equipment but also to large electronic equipment represented by an automobile as well as a power storage system represented by a house.

Among them, a lithium ion secondary battery has high expectation because not only downsizing and increase in the storage capacity can be easily achieved but also a high energy density can be obtained as compared with a lead battery or a nickel cadmium battery.

The lithium ion secondary battery as mentioned above comprises a positive electrode, a negative electrode, a separator, and an electrolyte solution, wherein the negative electrode thereof includes a negative electrode active material which involves in the charge and discharge reactions.

In the negative electrode active material, carbon-based active materials are widely used, wherein a further increase in the battery capacity is requested from recent market needs. In order to increase the battery capacity, as the material for the negative electrode active material, use of silicon is being studied. This is because a significant increase in the battery capacity can be expected with silicon, for the theoretical capacity of silicon (4199 mAh/g) is more than 10 times than the theoretical capacity of graphite (372 mAh/g). Development of a silicon material as the material for the negative electrode active material are carried out with regard not only to a silicon simple substance but also to compounds represented by alloys, oxides or the like. Besides, with regard to the form of the active material in the carbon-based active material, the study is being made from a standard coating type to an integrated type directly deposited onto a current collector.

However, when silicon is used as a main raw material in the negative electrode active material, the negative electrode active material undergoes expansion and contraction during charge and discharge, so that a crack can easily occur mainly near to surface of the negative electrode active material. Furthermore an ionic substance is generated inside the active material, and the negative electrode active material becomes easily broken. When the surface of the negative electrode active material is cracked, a new surface is formed so that the reactive area of the active material increases. At this time, not only a decomposition reaction of the electrolyte solution takes place on the new surface but also the electrolyte solution is consumed because a film of the decomposition product of the electrolyte solution is formed on the new surface. Accordingly, the cycle property can be readily deteriorated.

Until now, in order to improve initial efficiency and cycle characteristics of a battery, various investigations have been made with regard to the electrode configuration as well as the negative electrode material for the lithium ion secondary battery mainly composed of a silicon material.

Specifically, in order to obtain excellent cycle characteristics and high safety, silicon and amorphous silicon oxide are simultaneously deposited by using a gas method (for example, see Patent literature 1). In order to obtain high battery capacity and safety, a carbon material (electronic conductive material) is disposed on surface of silicon oxide particles (for example, see Patent literature 2). In order to improve the cycle characteristics as well as to obtain the high input/output characteristics, an active material containing silicon and oxygen is produced, and also an active material layer having a high oxygen ratio near the current collector is formed (for example, see Patent literature 3). In order to improve the cycle characteristics, the silicon active material is made so as to contain oxygen with an average oxygen content of 40 at % or less and also to have a higher oxygen content near the current collector (for example, see Patent literature 4).

In order to improve a first time charge and discharge efficiency, a nano composite including an Si phase, $SiO_2$, and $M_yO$ metal oxide is used (for example, see Patent literature 5). In order to improve the cycle characteristics, a mixture of $SiO_x$ ($0.8 \leq x \leq 1.5$ and particle diameter range of 1 to 50 μm) with a carbon material is burned at high temperature (for example, see Patent literature 6). In order to improve the cycle characteristics, a molar ratio of oxygen to silicon in the negative electrode active material is made 0.1 to 1.2, and the active material is controlled such that the difference between the maximum and minimum values of the molar ratio near the interface of the active material and the current collector is in the range of 0.4 or less (for example, see Patent literature 7). In order to improve the battery load characteristics, a metal oxide including lithium is used (for example, see Patent literature 8). In order to improve the cycle characteristics, a hydrophobic layer such as a silane compound is formed on the silicon material surface layer (for example, see Patent literature 9). In order to improve the cycle characteristics, silicon oxide is used, and on the surface layer thereof, a graphite film is formed so as to provide conductivity (for example, see Patent literature 10). In Patent literature 10, with regard to the shift values obtained from the Raman spectrum of the graphite film, broad peaks are appeared at 1330 $cm^{-1}$ and 1580 $cm^{-1}$ with the intensity ratio $I_{1330}/I_{1580}$ being $1.5<I_{1330}/I_{1580}<3$. In order to obtain a high battery capacity and to improve the cycle characteristics, particles having a silicon microcrystal phase dispersed in silicon dioxide are used (for example, see Patent literature 11). In order to improve the over-charge and over-discharge characteristics, a silicon oxide in which atomic ratio of silicon to oxygen is controlled at 1:y ($0<y<2$) is used (for example, see Patent literature 12).

CITATION LIST

Patent Literature

Patent literature 1: Japanese Patent Laid-Open Publication No. 2001-185127
Patent literature 2: Japanese Patent Laid-Open Publication No. 2002-042806
Patent literature 3: Japanese Patent Laid-Open Publication No. 2006-164954
Patent literature 4: Japanese Patent Laid-Open Publication No. 2006-114454
Patent literature 5: Japanese Patent Laid-Open Publication No. 2009-070825
Patent literature 6: Japanese Patent Laid-Open Publication No. 2008-282819
Patent literature 7: Japanese Patent Laid-Open Publication No. 2008-251369
Patent literature 8: Japanese Patent Laid-Open Publication No. 2008-177346
Patent literature 9: Japanese Patent Laid-Open Publication No. 2007-234255
Patent literature 10: Japanese Patent Laid-Open Publication No. 2009-212074
Patent literature 11: Japanese Patent Laid-Open Publication No. 2009-205950
Patent literature 12: Japanese Patent No. 2997741

SUMMARY OF INVENTION

Technical Problem

The present invention was made in view of the problems mentioned above, and thus, it has an object to provide: a negative electrode active material which can improve an initial charge and discharge characteristics and a cycle characteristics when it is used as the negative electrode active material for a secondary battery; a mixed negative electrode active material including the negative electrode active material; a negative electrode having a negative electrode active material layer formed with the negative electrode active material; and a lithium ion secondary battery using the negative electrode active material. In addition, an object thereof is to provide a method for producing a negative electrode active material which can improve an initial charge and discharge characteristics and a cycle characteristics. An object thereof is further to provide a method for producing a lithium ion secondary battery using the negative electrode active material that is produced by this method for producing the negative electrode active material.

Solution to Problem

In order to solve the problems mentioned above, the present invention provides a negative electrode active material, wherein the negative electrode active material is a negative electrode active material comprising negative electrode active material particles; the negative electrode active material particles comprise silicon compound particles comprising a silicon compound ($SiO_x$: $0.5 \leq x \leq 1.6$); the silicon compound particles include at least any one kind or more kinds of $Li_2SiO_3$ and $Li_4SiO_4$; the negative electrode active material particles have a loose bulk density BD of 0.5 g/cm$^3$ or more and 0.9 g/cm$^3$ or less, a tapped bulk density TD of 0.7 g/cm$^3$ or more and 1.2 g/cm$^3$ or less, and a compression degree of 25% or less, the compression degree being defined by (TD−BD)/TD.

Because the negative electrode active material of the present invention includes negative electrode active material particles which include silicon compound particles (sometimes referred to as silicon-based active material particles), a battery capacity thereof can be enhanced. In addition, because in the silicon compound, a $SiO_2$ component portion which is destabilized when lithium is inserted and released upon charging and discharging of the battery is modified to lithium silicate in advance, an irreversible capacity that is generated upon charging can be reduced. In addition, when the negative electrode active material particles satisfy the loose bulk density, the tapped density, and the compression degree as mentioned above, a negative electrode material can include an appropriate amount of a conductive additive among the negative electrode active material particles upon fabrication of the electrode; and thus, the first time efficiency as well as the cycle characteristics can be enhanced. In addition, in the case of the negative electrode active material like this, the electrode filling property can be enhanced when a coating method, wherein a slurry which includes the negative electrode active material is applied to the current collector to form the negative electrode active material layer, is used. Because of this, a shear stress to the negative electrode active material particles upon pressing the negative electrode active material layer for press molding can be reduced, so that stress on the negative electrode active material can be reduced and deformation of the negative electrode active material particles can be prevented; and thus, the cycle characteristics of the secondary battery can be improved.

In this case, in the negative electrode active material particles, it is preferable that a circularity Lc/Lp, defined by a ratio of Lc, which is a circumferential length of a circle having the same projected area as a particle, to Lp, which is a circumferential length of the particle, the circularity Lc/Lp being calculated from an image analysis of particle picture of the negative electrode active material particles, is an average 0.93 or more in a particle group of 5000 or more particles arbitrarily extracted from the negative electrode active material particles, as well as a rate of particles having the circularity of 0.85 or less is 5% or less.

The negative electrode active material like this has a small specific surface area thereof because circularity of the negative electrode active material particles is high. Accordingly, because formation of a film containing lithium on a surface can be suppressed to a low level in the first time charge and discharge, the initial efficiency of the negative electrode active material can be enhanced more effectively.

In addition, it is preferable that a ratio Dl/Ds, which is a ratio of Dl, a long diameter of a particle, to Ds, a short diameter of a particle, the ratio Dl/Ds being calculated from an image analysis of particle picture of the negative electrode active material particles, is an average of 1 or more and 1.4 or less in a particle group of 5000 or more particles arbitrarily extracted from the negative electrode active material particles.

In the negative electrode active material including the negative electrode active material particles which satisfies the condition like this, the contact area among the particles themselves included in the negative electrode active material increases. Accordingly, an electric contact or the like among the particles themselves included in the negative electrode active material becomes so good that the cycle characteristics is enhanced.

In addition, it is preferable that in the silicon compound particles, a half-value width (2θ) of a diffraction peak derived from a Si(111) crystal plane obtained from an X-ray-diffraction is 1.2° or more, and that a crystallite's size corresponding to this crystal plane is 7.5 nm or less.

When the negative electrode active material whose silicon compound particles has the silicon crystallinity as mentioned above is used as the negative electrode active material of the lithium ion secondary battery, further improved cycle characteristics and initial charge and discharge characteristics can be obtained.

In addition, in the negative electrode active material of the present invention, it is preferable that the silicon compound particles satisfy a relationship A>B, in which A is a maximum peak strength value in a Si and a Li silicate regions given as a chemical shift value of −60 ppm to −95 ppm and B is a peak strength value in a $SiO_2$ region given as a chemical shift value of −96 ppm to −150 ppm, these values being obtained from a $^{29}$Si-MAS-NMR spectrum thereof.

In the silicon compound particles, when amounts of Si and $Li_2SiO_3$ are larger as compared with the $SiO_2$ component as the standard, the negative electrode active material can have a sufficient enhancement effect in the battery characteristics due to the Li insertion.

In addition, it is preferable that a test cell is prepared which comprises a negative electrode, which includes a mixture of the negative electrode active material and a carbon-based active material, and a counter electrode lithium; in the test cell, charge in which a current is applied so as to insert lithium into the negative electrode active material and discharge in which a current is applied so as to release lithium from the negative electrode active material are executed for 30 times; and when a graph is drawn showing a relationship between a differential value dQ/dV, which is obtained by differentiating a discharge capacity Q in each charge and discharge with a voltage V of the negative electrode with a standard of the counter electrode lithium, and the voltage V, the voltage V of the negative electrode upon discharging on or after $X^{th}$ time (1≤X≤30) has a peak in a range of 0.40 V to 0.55 V.

The peak in the V-dQ/dV curve mentioned above resembles the peak of a silicon material. Because the discharge curve in a higher voltage side rises sharply, a capacity can be readily expressed upon battery design. In addition, when the peak appears within 30 times of the charge and discharge, it can give the negative electrode active material formed with a stable bulk.

In addition, it is preferable that the negative electrode active material particles have a median diameter of 1.0 μm or more and 15 μm or less.

If the median diameter is 1.0 μm or more, increase in the battery's irreversible capacity due to the increase in the surface area per mass can be suppressed. On the other hand, if the median diameter is 15 μm or less, the particle is difficult to be cracked so that new surface is difficult to appear.

In addition, it is preferable that the negative electrode active material particles include a carbon material on a surface portion thereof.

When the negative electrode active material particles include a carbon material on a surface portion thereof, conductivity thereof can be enhanced.

In addition, it is preferable that an average thickness of the carbon material is 10 nm or more and 5000 nm or less.

When the average thickness of the carbon material is 10 nm or more, the conductivity thereof can be enhanced. Furthermore, when the average thickness of the covering carbon material is 5000 nm or less, by using the negative electrode active material including the negative electrode active material particles like this in the lithium ion secondary battery, sufficient amount of the silicon compound particles can be ensured, so that the decrease in the battery capacity can be suppressed.

The present invention provides a mixed negative electrode active material including the negative electrode active material and a carbon-based active material.

Accordingly, when the material for forming a negative electrode active material layer is made to include the negative electrode active material of the present invention (silicon-based negative electrode active material) as well as a carbon-based active material, not only conductivity of the negative electrode active material layer can be enhanced but also an expansion stress due to charging can be relaxed. In addition, by mixing the silicon-based negative electrode active material with the carbon-based active material, the battery capacity can be increased.

In addition, in order to achieve the above object, the present invention provides a negative electrode for a non-aqueous electrolyte secondary battery wherein the negative electrode contains the mixed negative electrode active material, and a ratio of the mass of the negative electrode active material to a total mass of the negative electrode active material and the carbon-based active material is 6% or more by mass.

When the ratio of the mass of the negative electrode active material (silicon-based negative electrode active material) to a total mass of the negative electrode active material (silicon-based negative electrode active material) and the carbon-based active material is 6% or more by mass, the battery capacity can be enhanced furthermore.

In order to achieve the object mentioned above, the present invention provides a negative electrode for a non-aqueous electrolyte secondary battery wherein the negative electrode comprises: a negative electrode active material layer formed by the mixed negative electrode active material and a negative electrode current collector; and the negative electrode active material layer is formed on the negative electrode current collector; and the negative electrode current collector includes carbon and sulfur with the contents of each being 100 ppm or less by mass.

When the negative electrode current collector to construct the negative electrode contains carbon and sulfur with the amounts thereof as shown above, deformation of the negative electrode upon charging can be suppressed.

In addition, in order to achieve the object mentioned above, the present invention provides a lithium ion secondary battery wherein a negative electrode comprising the negative electrode active material is used therein.

In the lithium ion secondary battery using the negative electrode which includes the negative electrode active material like this, a high capacity as well as excellent cycle characteristics and initial charge and discharge characteristics can be obtained.

In addition, in order to achieve the object mentioned above, the present invention provides a method for producing a negative electrode active material, wherein the method is a method for producing a negative electrode active material comprising negative electrode active material particles which comprises silicon compound particles; the method comprising: a step of forming negative electrode active material particles comprising silicon compound particles which include a silicon compound ($SiO_x$: 0.5≤x≤1.6); a step of inserting Li into the negative electrode active material particles so as to include at least any one kind or more kinds of $Li_2SiO_3$ and $Li_4SiO_4$ therein; a step of selecting, from the negative electrode active material particles, negative electrode active material particles having a loose bulk density BD of 0.5 g/cm$^3$ or more and 0.9 g/cm$^3$ or less, a tapped bulk density TD of 0.7 g/cm$^3$ or more and 1.2 g/cm$^3$ or less, and a compression degree of 25% or less, the compression degree being defined by (TD−BD)/TD, whereby producing the negative electrode active material by using the negative electrode active material particles thus selected.

When the negative electrode active material is produced by selecting the silicon-based active material particles in the way as mentioned above, the negative electrode active material having not only a high capacity upon using it as the negative electrode active material of a lithium ion secondary battery but also excellent cycle characteristics and initial charge and discharge characteristics can be produced.

In addition, in order to achieve the object mentioned above, the present invention provides a method for producing a lithium ion secondary battery, wherein a negative electrode is produced by using the negative electrode active material produced by the method for producing the negative electrode active material, and the lithium ion secondary battery is produced by using the negative electrode thus produced.

By using the negative electrode active material produced in the way as mentioned above, the lithium ion secondary battery having not only a high capacity but also excellent cycle characteristics and initial charge and discharge characteristics can be produced.

Advantageous Effects of Invention

When the negative electrode active material of the present invention is used as the negative electrode active material of the secondary battery, not only a high capacity but also excellent cycle characteristics and initial charge and discharge characteristics can be obtained. The same effects can be obtained in the mixed negative electrode active material, as well as in the negative electrode and in the lithium ion secondary battery, all of them using the negative electrode active material mentioned above. Further, according to the method for producing the negative electrode active material of the present invention, the negative electrode active material having not only a high capacity but also excellent cycle characteristics and initial charge and discharge characteristics can be produced when this is used as the negative electrode active material of the secondary battery.

DESCRIPTION OF EMBODIMENTS

In what follows, embodiments of the present invention will be explained; however, the present invention is not limited to these.

As mentioned above, as one method to increase a battery capacity of the lithium ion secondary battery, as the negative electrode of the lithium ion secondary battery, use of a negative electrode mainly using a silicon material is being investigated. It is hoped that the lithium ion secondary battery using this silicon material has the initial charge and discharge characteristics as well as the cycle characteristics almost as same as those of the lithium ion secondary battery using the carbon-based active material. However, a proposal has not been made yet with regard to the negative electrode active material having the initial charge and discharge characteristics as well as the cycle characteristics almost as same as those of the lithium ion secondary battery using the carbon-based active material.

Therefore, inventors of the present invention carried out an extensive investigation to obtain a negative electrode active material having a high battery capacity as well as excellent cycle characteristics and first time efficiency when it is used in a secondary battery; and as a result, the present invention could be achieved.

The negative electrode active material of the present invention includes negative electrode active material particles. And, the negative electrode active material particles include silicon compound particles including a silicon compound ($SiO_x$: 0.5≤x≤1.6). This silicon compound particles include at least any one kind or more kinds of lithium silicates $Li_2SiO_3$ and $Li_4SiO_4$. And, the negative electrode active material particles satisfy a loose bulk density BD of 0.5 g/cm$^3$ or more and 0.9 g/cm$^3$ or less, a tapped bulk density TD of 0.7 g/cm$^3$ or more and 1.2 g/cm$^3$ or less, and a compression degree of 25% or less, the compression degree being defined by (TD−BD)/TD.

In the negative electrode active material like this, a battery capacity thereof can be increased because this includes the negative electrode active material particles including the silicon compound particles. In addition, when the silicon compound particles include the lithium silicates as mentioned above, an irreversible capacity generated upon charging can be reduced. In addition, when the negative electrode active material particles satisfying the loose bulk density, the tapped bulk density, and the compression degree as mentioned above is used, the negative electrode material can include an appropriate amount of a conductive additive among the negative electrode active material particles upon fabrication of the electrode, so that the first time efficiency and cycle characteristics of the battery can be enhanced. In addition, in the negative electrode active material like this, when a coating method is used wherein a slurry which includes the negative electrode active material is applied to the current collector so as to form the negative electrode active material layer, the electrode filling property can be enhanced. Because of this, a stress to the negative electrode active material particles upon pressing the negative electrode active material layer for press molding can be reduced, so that deformation of the negative electrode active material particles and the like can be prevented; and thus, the cycle characteristics of the secondary battery can be enhanced.

<Negative Electrode for the Non-Aqueous Electrolyte Secondary Battery>

Figure 1:
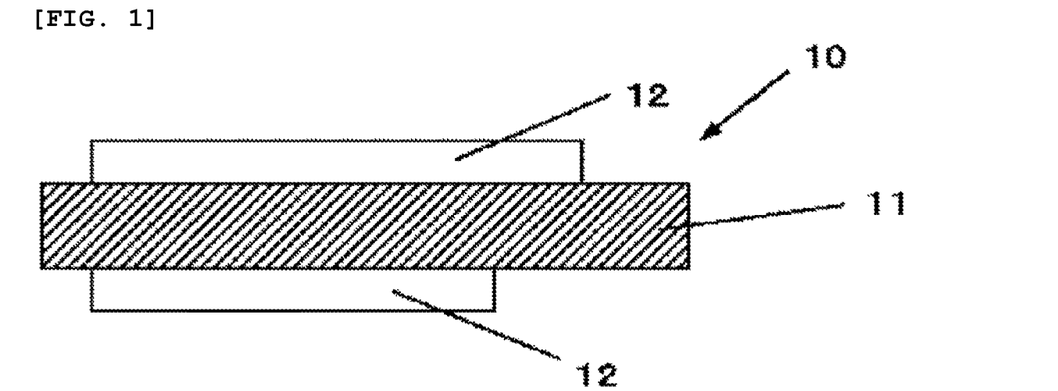
FIG. 1 is a cross-sectional view showing a composition of the electrode for the non-aqueous electrolyte secondary battery of the present invention.

First, the negative electrode for the non-aqueous electrolyte secondary battery will be explained. FIG. 1 illustrates a cross-sectional composition of the negative electrode for the non-aqueous electrolyte secondary battery (hereinafter, this is sometimes referred to as "negative electrode") in one embodiment of the present invention.

[Composition of the Negative Electrode]

As illustrated in FIG. 1, a negative electrode 10 has a composition in which a negative electrode active material layer 12 is arranged on a negative electrode current collector 11. The negative electrode active material layer 12 may be formed on both surfaces of the negative electrode current collector 11, or only on one surface thereof. Alternatively, the negative electrode current collector 11 may not be necessary when the negative electrode active material of the present invention is used.

[Negative Electrode Current Collector]

The negative electrode current collector 11 is an excellent conductive material and formed of a mechanically strong material. Example of the conductive material usable in the negative electrode current collector 11 includes, for example, copper (Cu) and nickel (Ni). It is preferable that the conductive material does not form an intermetallic compound with lithium (Li).

It is preferable that the negative electrode current collector 11 includes carbon (C) and sulfur (S), in addition to main elements. This is because a physical strength of the negative electrode current collector can be increased by so doing. Especially in the case that an active material layer which expands upon charging is included, if the current collector includes the elements mentioned above, deformation of the electrode including the current collector can be suppressed. Contents of these elements are not particularly restricted; but especially, it is preferable that content of each element is 100 ppm or less by mass. This is because a higher effect to suppress the deformation can be obtained. Owing to this effect to suppress the deformation, the cycle characteristics can be enhanced furthermore.

Surface of the negative electrode current collector 11 may be made rough or not be made rough. Example of the roughed negative electrode current collector includes, for example, a metal foil having been subjected to an electrolysis treatment, an emboss treatment, a chemical etching treatment or the like. Example of the negative electrode current collector not being made rough includes, for example, a rolled metal foil or the like.

[Negative Electrode Active Material Layer]

The negative electrode active material layer 12 includes the negative electrode active material of the present invention which can occlude and emit a lithium ion; and in addition, in view of a battery design, it may include other materials such as a negative electrode binder and a conductive additive. The negative electrode active material includes the negative electrode active material particles, and the negative electrode active material particles include the silicon compound particles including the silicon compound ($SiO_x$: $0.5 \leq x \leq 1.6$).

In addition, the negative electrode active material layer 12 may include the material of mixed negative electrode active material including the negative electrode active material of the present invention and the carbon-based active material. With these, not only an electric resistance of the negative electrode active material layer can be lowered but also an expansion stress due to charging can be relaxed. Example of the carbon-based active material usable includes, for example, a thermally decomposed carbon, a coke, a glass-like carbon fiber, a burned organic polymer compound body, a carbon black and the like.

In the negative electrode of the present invention, it is preferable that the ratio of the mass of the negative electrode active material (silicon-based negative electrode active material) of the present invention to the total mass of the negative electrode active material (silicon-based negative electrode active material) and the carbon-based active material is 6% or more by mass. If the ratio of the mass of the negative electrode active material of the present invention to the total mass of the negative electrode active material of the present invention and the carbon-based active material is 6% or more by mass, increase in the battery capacity can be ensured.

Furthermore, the negative electrode active material of the present invention is the silicon oxide material which includes the silicon compound particles, and the silicon compound particles include the silicon compound ($SiO_x$: $0.5 \leq x \leq 1.6$) as mentioned before; however, in the composition thereof, it is more preferable when x approaches near to 1. This is because an excellent cycle characteristics can be obtained by so doing. Meanwhile, composition of the silicon compound in the present invention does not necessarily mean a purity of 100%, so that it may contain minute amounts of impurity elements.

In the negative electrode active material of the present invention, the silicon compound particles include at least any one kind or more kinds of $Li_2SiO_3$ and $Li_4SiO_4$. These are the materials in which a $SiO_2$ component portion that is destabilized upon insertion and release of lithium upon charging and discharging of the battery are modified to different lithium silicates in advance; and thus, the irreversible capacity generated upon charging can be reduced.

When at least any one kind or more kinds of $Li_4SiO_4$ and $Li_2SiO_3$ is present in the bulk of the silicon compound particles, the battery characteristics can be enhanced; however, when these two Li compounds are present concurrently, the battery characteristics can be enhanced furthermore. Meanwhile, these lithium silicates may be quantified by NMR (Nuclear Magnetic Resonance) or XPS (X-ray Photoelectron Spectroscopy). Measurements of XPS and NMR may be made, for example, by the following conditions.

XPS
  Instrument: X-ray photoelectron spectroscopy instrument
  X-ray source: mono-colored Al Kα beam
  X-ray spot diameter: 100 μm
  Ar ion gun sputtering condition: 0.5 kV/2 mm×2 mm
$^{29}$Si MAS NMR (magic angle spinning nuclear magnetic resonance)
  Instrument: 700 NMR spectrophotometer (manufactured by Bruker Corp.)
  Probe: 4 mmHR-MAS rotor 50 μL
  Sample rotation speed: 10 kHz
  Measured environment temperature: 25° C.

In the silicon compound particles, it is preferable that the half-value width (2θ) of the diffraction peak derived from the Si(111) crystal plane obtained from the X-ray-diffraction is 1.2° or more, and that the crystallite's size corresponding to the crystal plane is 7.5 nm or less. Silicon crystallinity of the silicon compound in the silicon compound particles is better as the crystallinity thereof is lower; and thus, especially when amount of the Si crystal is small, not only the battery characteristics can be enhanced but also a stable Li compound can be produced.

In addition, it is preferable that the negative electrode active material of the present invention satisfies in the silicon compound particles therein a relationship A>B, wherein A is a maximum peak strength value in a Si and a Li silicate regions given as a chemical shift value of −60 ppm to −95 ppm and B is a peak strength value in a $SiO_2$ region given as a chemical shift value of −96 ppm to −150 ppm, these values being obtained from a $^{29}$Si-MAS-NMR spectrum. In the silicon compound particles, when amount of the silicon component or of $Li_2SiO_3$ is comparatively large relative to the $SiO_2$ component taken as the standard, a sufficient enhancement effect in the battery characteristics due to the Li insertion can be obtained. Meanwhile, the measurement conditions of $^{29}$Si-MAS-NMR may be the same as described above.

In addition, in the negative electrode active material of the present invention, it is preferable that the negative electrode active material particles include the carbon material in the surface portion thereof. When the negative electrode active material particles include the carbon material in the surface portion thereof, conductivity can be enhanced; and thus, when the negative electrode active material including the negative electrode active material particles like this is used as the negative electrode active material of the secondary battery, the battery characteristics can be enhanced.

In addition, it is preferable that an average thickness of the carbon material in the surface portion of the negative electrode active material particles is 10 nm or more and 5000 nm or less. When the average thickness of the carbon material is 10 nm or more, the conductivity thereof can be enhanced. On the other hand, when the average thickness of the covering carbon material is 5000 nm or less, decrease in the battery capacity can be suppressed when the negative electrode active material including the negative electrode active material particles like this is used as the negative electrode active material of the lithium ion secondary battery.

The average thickness of this carbon material can be calculated, for example, by the procedure shown below. First, the negative electrode active material particles are observed with TEM (transmission electron microscope) with an arbitrary magnification. The magnification that allows visual confirmation of a thickness of the carbon material so as to be able to measure the thickness is preferable. Next, the thickness of the carbon material is measured in arbitrary 15 points. At this time, it is preferable to set the measurement points widely and randomly, not to concentrate to a certain spot as much as possible. Finally, the average value of the thicknesses of the 15 spots in the carbon material is calculated.

The coverage of the carbon material is not particularly restricted; however, the coverage as high as possible is preferable. The coverage of 30% or more is preferable because the conductivity can be enhanced furthermore. The covering method of the carbon material is not particularly restricted; however, a sugar carbide method and a thermal decomposition method of a hydrocarbon gas are preferable. This is because the coverage can be increased with these methods.

In addition, it is preferable that the median diameter ($D_{50}$: particle diameter when the cumulative volume reaches 50%) of the negative electrode active material particles is 1.0 μm or more and 15 μm or less. This is because when the median diameter is within the above-mentioned range, not only adsorption and release of the lithium ion upon charging and discharging is facilitated but also the particle is difficult to be cracked. When the median diameter is 1.0 μm or more, the surface area per a unit mass can be made small, so that increase in the battery's irreversible capacity can be suppressed. On the other hand, when the median diameter is made 15 μm or less, the particle is difficult to be cracked, so that a new surface is difficult to emerge.

In addition, in the negative electrode active material of the present invention, it is preferable that in the negative electrode active material particles, circularity Lc/Lp, defined by a ratio of Lc, which is a circumferential length of a circle having the same projected area as a particle, to Lp, which is a circumferential length of the particle, the circularity Lc/Lp being calculated from an image analysis of particle picture of the negative electrode active material particles, is an average 0.93 or more in a particle group of 5000 or more particles arbitrarily extracted from the negative electrode active material particles, as well as a rate of particles having the circularity of 0.85 or less is 5% or less.

When the rate of the particles having the average value of the circularity Lc/Lp of the negative electrode active material particles and the circularity of 0.85 or less are within the ranges as mentioned above, it can be said that the circularity of the negative electrode active material particles is sufficiently high, so that the negative electrode active material particles like this is small in a specific surface area thereof. Accordingly, because formation of the lithium-containing surface-covering material can be suppressed to a low level in the first time charge and discharge, the initial efficiency of the negative electrode active material can be enhanced more effectively.

The circularity can be conveniently measured by the image analysis using the wet-flow type particle diameter and form analysis instrument (for example, FPIA-3000 (manufactured by Malvern Instruments Ltd.) or the like).

In addition, in the negative electrode active material of the present invention, it is preferable that in the negative electrode active material particles, a ratio Dl/Ds, which is a ratio of Dl, a long diameter of a particle, to Ds, a short diameter of a particle, the ratio Dl/Ds being calculated from an image analysis of particle picture of the negative electrode active material particles, is an average of 1 or more and 1.4 or less in a particle group of 5000 or more particles arbitrarily extracted from the negative electrode active material particles.

In the negative electrode active material including the negative electrode active material particles which satisfy the condition like this, the contact area among the particles themselves included in the negative electrode active material increases. Accordingly, an electric contact or the like among the particles themselves included in the negative electrode active material becomes so good that the cycle characteristics is enhanced.

The ratio Dl/Ds, which is a ratio of Dl, a long diameter of a particle, to Ds, a short diameter of a particle (sometimes this ratio is referred to as an aspect ratio) may be conveniently measured by the image analysis using the wet-flow type particle diameter and form analysis instrument (for example, FPIA-3000 (manufactured by Malvern Instruments Ltd.) or the like). In the projected plane of the composite secondary particle observed with this instrument, length of the straight line between the most distant two points can be taken as the long diameter Dl, and the length of the portion of the line in the projected plane among the straight lines which are perpendicular to the long diameter and pass through the midpoint of the long diameter can be taken as the short diameter Ds.

In addition, in the negative electrode active material of the present invention, it is preferable that a test cell is prepared which comprises a negative electrode, which includes a mixture of the negative electrode active material and a carbon-based active material, and a counter electrode lithium; in the test cell, charge in which a current is applied so as to insert lithium into the negative electrode active material and discharge in which a current is applied so as to release lithium from the negative electrode active material are executed for 30 times; and when a graph is drawn showing a relationship between a differential value dQ/dV, which is obtained by differentiating a discharge capacity Q in each charge and discharge with a voltage V of the negative electrode based on the counter electrode lithium, and the voltage V, the voltage V of the negative electrode upon discharging on or after $X^{th}$ time ($1 \leq X \leq 30$) has a peak in a range of 0.40 V to 0.55 V. The peak in the V–dQ/dV curve mentioned above resembles the peak of a silicon material. Because the discharge curve in a higher voltage side rises sharply, a capacity can be readily expressed upon battery design. In addition, when the negative electrode active material expresses the peak within 30 times of the charge and discharge, it can be judged that a stable bulk is formed.

As to the negative electrode binder included in the negative electrode active material, for example, any one or more of a polymer material, a synthetic rubber or the like may be used. Example of the polymer material includes, for example, polyvinylidene fluoride, polyimide, polyamide imide, aramid, polyacrylic acid, lithium polyacrylate, carboxymethyl cellulose and the like. Example of the synthetic rubber includes, for example, a styrene butadiene rubber, a fluorinated rubber, ethylene propylene diene and the like.

As to the negative electrode conductive additive, for example, any one kind or more kinds of carbon materials such as a carbon black, an acetylene black, a graphite, a Ketjen black, a carbon nanotube, a carbon nanofiber and the like may be used.

The negative electrode active material layer is formed, for example, by a coating method. The coating method is the method in which the negative electrode active material particles, the binder and the like as well as, if necessary, the conductive additive and the carbon material are mixed, the resulting mixture is dispersed in an organic solvent or water, and then this is applied.

[Method for Producing the Negative Electrode]

The negative electrode can be produced, for example, by the procedure shown below. At first, the method for producing the negative electrode active material to be used for the negative electrode will be explained. First, the negative electrode active material particles which include the silicon compound particles including the silicon compound ($SiO_x$: $0.5 \leq x \leq 1.6$) is prepared. Next, Li is inserted into the negative electrode active material particles so as to include at least any one kind or more kinds of $Li_2SiO_3$ and $Li_4SiO_4$. Next, the particles having the loose bulk density BD of 0.5 g/cm$^3$ or more and 0.9 g/cm$^3$ or less, the tapped bulk density TD of 0.7 g/cm$^3$ or more and 1.2 g/cm$^3$ or less, and the compression degree of 25% or less, the compression degree being defined by (TD-BD)/TD, are selected from the negative electrode active material particles. Then, by using the selected negative electrode active material particles, the negative electrode active material is prepared.

More specifically, the negative electrode active material can be produced as follows. First, a raw material capable of generating a silicon oxide gas is heated under reduced pressure in the presence of an inert gas in the temperature range of 900 to 1600° C., so that the silicon oxide gas is generated. Considering the presence of oxygen on surface of the metal silicon powder as well as minute oxygen in a reaction furnace, the mixing molar ratio is preferably 0.8<metal silicon powder/silicon dioxide powder<1.3.

The generated silicon oxide gas is solidified on an adsorption plate and deposited thereon. Next, the deposited silicon oxide is taken out under the state that the temperature inside the reaction furnace is dropped to 100° C. or lower; and then, it is crushed and pulverized by using a ball mill, a jet mill or the like. In this way, the silicon compound particles can be prepared. Meanwhile, the Si crystallite in the silicon compound particles can be controlled by changing the temperature to vaporize, or a heat treatment after the generation thereof.

Here, a layer of the carbon material may be formed on surface layer of the silicon compound particles. As to the formation method of the carbon material layer, a thermal decomposition CVD method is preferable. A method for forming the carbon material layer by the thermal decomposition CVD method will be explained.

First, the silicon compound particles are set in a furnace. Next, a hydrocarbon gas is introduced into the furnace, and then, the temperature inside the furnace is raised. The decomposition temperature is not particularly restricted; however, 1200° C. or lower is preferable, while more preferably 950° C. or lower. When the decomposition temperature of 1200° C. or lower is used, the active material particles can be suppressed from unintended disproportionation. After the temperature inside the furnace is raised to a predetermined temperature, the carbon layer is formed on surface of the silicon compound particles. The hydrocarbon gas used as the raw material of the carbon material is not particularly restricted; however, in the $C_nH_m$ composition, $n \leq 3$ is preferable. When $n \leq 3$, not only the production cost thereof can be made low, but also physical properties of the decomposition products can be made excellent.

Next, Li is inserted into the negative electrode active material particles including the silicon active material particles thus prepared so as to include at least any one of $Li_2SiO_3$ and $Li_4SiO_4$. Insertion of Li is preferably carried out by a thermal doping method.

In modification by the thermal doping method, for example, modification can be made by mixing the negative electrode active material particles with LiH powder or with Li powder, followed by heating the resulting mixture under a non-oxidizing atmosphere. As to the non-oxidizing atmosphere, for example, an Ar atmosphere or the like may be used. More specifically, first, under the Ar atmosphere, the silicon oxide powder is mixed well with the LiH powder or with the Li powder, and then the resulting mixture is sealed in a vessel; and then, the whole vessel is stirred so as to make the mixture uniform. Thereafter, heating thereof is carried out at 700 to 750° C. to carry out modification. In this case, in order to release Li from the silicon compound, the powder after heating is sufficiently cooled down; and then, washing may be done with an alcohol, a basic aqueous solution, a weak acid, or pure water.

Alternatively, Li may be inserted into the negative electrode active material particles by the oxidation and reduction method. In the modification by the oxidation and reduction method, for example, first, Li can be inserted by soaking the silicon oxide particles into a solution A in which lithium is dissolved in an ether solvent. In this solution A, further a polycyclic aromatic compound or a linear polyphenylene compound may be included. After insertion of Li, by soaking the silicon oxide particles into a solution B which includes the polycyclic aromatic compound or a derivative thereof, an active Li can be released from the silicon oxide particles. Example of the usable solvent in the solution B includes an ether-based solvent, a ketone-based solvent, an ester-based solvent, an alcohol-based solvent, an aminebased solvent, or a mixed solvent of them. Further, after soaking in the solution B, when the silicon oxide particles are soaked into a solution C including an alcohol-based solvent, a carboxylic acid-based solvent, water, or a mixed solvent of them, more amount of the active Li can be released from the silicon oxide particles. Alternatively, in place of the solution C, a solution C', in which a compound having a quinoid structure in the molecule thereof is included as the solute and an ether-based solvent, a ketone-based solvent, an ester-based solvent, or a mixture of them is included as the solvent, may be used. Besides, soaking of the silicon oxide particles into the solution B, C, or C' may be carried out repeatedly. When after insertion of lithium the active lithium is released in the way as mentioned above, the negative electrode active compound having a higher water resistance can be obtained. Thereafter, washing may be carried out by using an alcohol, an aqueous basic solution having lithium carbonate dissolved therein, a weak acid, pure water or the like.

Figure 2:
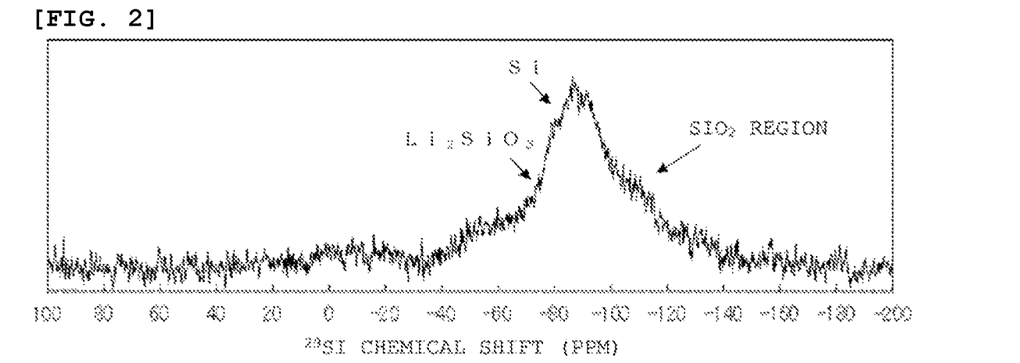
FIG. 2 is one example of the $^{29}$Si-MAS-NMR spectra measured from the silicon compound particles when these are modified by the oxidation and reduction method.

Meanwhile, when modification is carried out by the thermal doping method, the $^{29}$Si-MAS-NMR spectrum obtained from the silicon compound particles is different from that obtained by the oxidation and reduction method. In FIG. 2, one example of the $^{29}$Si-MAS-NMR spectrum measured from the silicon compound particles by the modification with the oxidation and reduction method. In FIG. 2, the peak given near −75 ppm is derived from $Li_2SiO_3$, and the peak given in −80 ppm to −100 ppm is derived from Si. By the way, there are sometimes peaks of Li silicates other than $Li_2SiO_3$ and $Li_4SiO_4$ in −80 ppm to −100 ppm.

Figure 3:
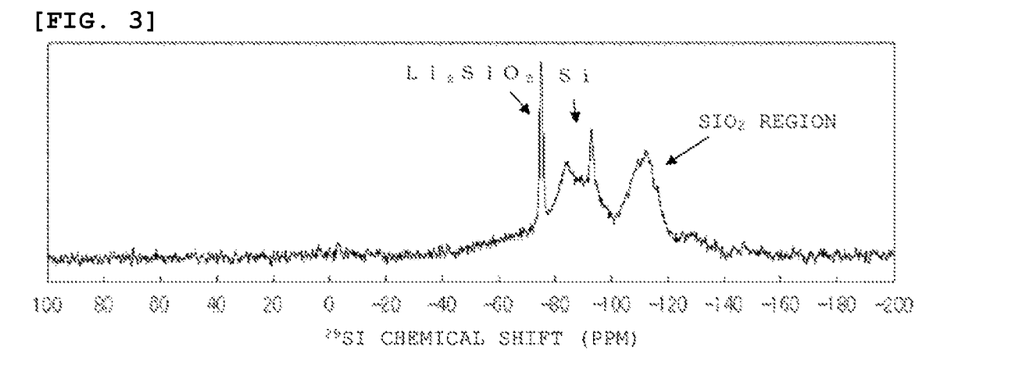
FIG. 3 is one example of the $^{29}$Si-MAS-NMR spectra measured from the silicon compound particles when these are modified by the thermal doping method.

In FIG. 3, one example of the $^{29}$Si-MAS-NMR spectrum obtained from the silicon compound particles by the modification with the thermal doping method. In FIG. 3, the peak given near −75 ppm is derived from $Li_2SiO_3$, and the peak given in −80 ppm to −100 ppm is derived from Si. Meanwhile, there are sometimes peaks of Li silicates other than $Li_2SiO_3$ and $Li_4SiO_4$ in −80 ppm to −100 ppm. By the way, from the XPS spectrum, the $Li_4SiO_4$ peak can be confirmed.

Next, from the negative electrode active material particles after modification, particles having the loose bulk density BD of 0.5 g/cm$^3$ or more and 0.9 g/cm$^3$ or less, the tapped bulk density TD of 0.7 g/cm$^3$ or more and 1.2 g/cm$^3$ or less, and the compression degree of 25% or less, the compression degree being defined by (TD−BD)/TD, are selected.

The loose bulk density BD of the negative electrode active material particles can be measured, for example, the following method. First, the sample of the negative electrode active material particles for the measurement is freely dropped by using a funnel into a 200 mL beaker (diameter 67 mm×height 90 mm, made of a glass). The height from the funnel exit to surface of the beaker arranged is 270 mm. Next, the sample mass which is freely dropped till 200 mL (cm$^3$) is weighed to the digit of 1 mg. From this value, the loose bulk density is calculated from the following equation.

Loose bulk density BD (g/cm$^3$)=sample mass (g)/ sample volume (cm$^3$)

The test is preferably carried out 3 or more times; and the measurement result is expressed preferably by the average value thereof. Meanwhile, when the sample surface after tapping is slanted, the surface thereof needs to be made flat, but not with tapping.

The tapped bulk density TD of the negative electrode active material particles can be measured, for example, the following method. For example, after measurement of the loose bulk density as mentioned above, it is tapped for 200 times to calculate the tapped density by the following equation.

Tapped density (g/cm$^3$)=sample mass (g)/sample volume after tapping (cm$^3$)

The test is preferably carried out 3 or more times; and the measurement result is expressed preferably by the average value thereof. Meanwhile, when the sample surface after tapping is slanted, the surface thereof needs to be made flat, but not with tapping.

From the loose bulk density BD and the tapped bulk density TD as measured by the way mentioned above, the compression degree defined by (TD−BD)/TD can be calculated.

Meanwhile, selection of the negative electrode active material particles is not needed every time when it is produced. Once the production condition with which the loose bulk density BD, the tapped density TD, and the compression degree satisfy the above condition is found and selected, thereafter, the negative electrode active material can be produced with the same condition as the selected condition.

The negative electrode active material prepared in the way as mentioned above is mixed with other materials such as the negative electrode binder and the conductive additive to obtain the negative electrode mix, which is followed by addition of an organic solvent, water or the like to obtain a slurry. Next, this slurry is applied onto the negative electrode current collector surface and then dried to form the negative electrode active material layer. At this time, a hot press or the like may be carried out as needed. In the way as mentioned above, the negative electrode can be produced.

<Lithium Ion Secondary Battery>

Next, the lithium ion secondary battery of the present invention will be explained. The lithium ion secondary battery of the present invention uses the negative electrode including the negative electrode active material of the present invention. Here, the laminate film type lithium ion secondary battery is taken as the specific example thereof.

[Composition of the Laminate Film Type Lithium Ion Secondary Battery]

Figure 4:
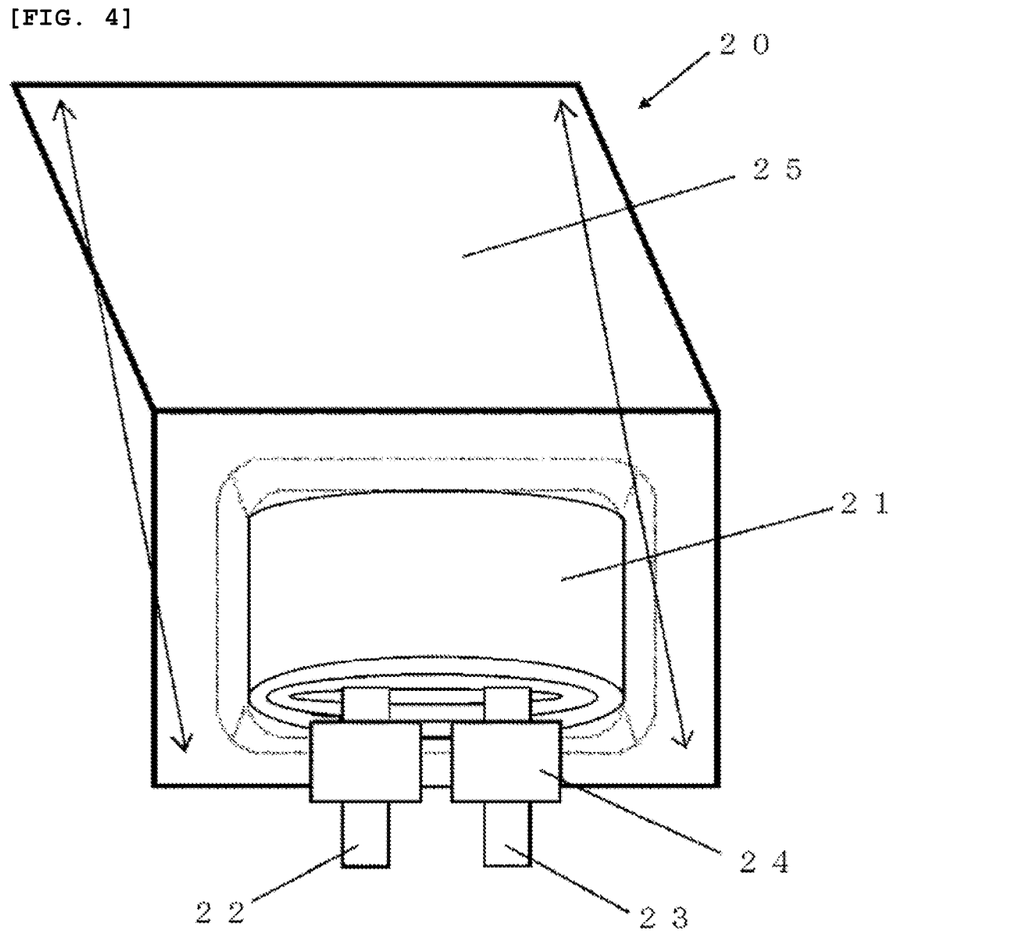
FIG. 4 is a figure illustrating a composition example (laminate film type) of the lithium secondary battery of the present invention.

A laminate film type lithium ion secondary battery 20 shown in FIG. 4 has a rolled electrode body 21 stored inside an exterior member 25 mainly having a sheet form. This rolled body has a separator between a positive electrode and a negative electrode, and they are rolled. Alternatively, there is a case that a laminate body having the separator between the positive electrode and the negative electrode is stored. In the both electrode bodies, a positive electrode lead 22 is attached to the positive electrode, and a negative electrode lead 23 is attached to the negative electrode. The outermost periphery of the electrode body is protected by a protection tape.

The positive electrode and negative electrode leads are derived, for example, in one direction from inside to outside of the exterior member 25. The positive electrode lead 22 is formed of a conductive material such as, for example, aluminum; and the negative electrode lead 23 is formed of a conductive material such as nickel or copper.

The exterior member 25 is a laminate film in which, for example, a fusion-bond layer, a metallic layer, and a surface protection layer are laminated in this order. In the laminate film, the fusion-bond layer is fusion-bonded or adhered by an adhesive to each other in the outer peripheral portions in the fusion-bond layers of two films such that the fusion-bond layer may face to the electrode body 21. For example, the fusion-bond portion is a film of polyethylene, polypropylene or the like, and a metal portion is an aluminum foil or the like. The protection layer is, for example, nylon or the like.

Between the exterior member 25 and the positive and negative electrode leads, a close adhesion film 24 is inserted in order to prevent an outside air from entering therein. The material thereof is, for example, polyethylene, polypropylene, or a polyolefin resin.

[Positive Electrode]

The positive electrode has a positive electrode active material layer on both surfaces or on only one surface of the positive electrode current collector, for example, in the same way as the negative electrode 10 of FIG. 1.

The positive electrode current collector is formed of a conductive material such as, for example, aluminum.

The positive electrode active material layer includes any one kind, or two or more kinds of positive electrode materials which can occlude and emit a lithium ion, and may include other material such as a binder, a conductive additive, or a dispersant, depending on design. In this case, details of the binder and the conductive additive are, for example, the same as those of the negative electrode binder and the negative electrode conductive additive as described before.

The positive electrode material is preferably a lithium-containing compound. Example of the lithium-containing compound includes a composite oxide formed of lithium and a transition metal element, or a phosphate compound having lithium and a transition metal element. Among these positive electrode materials described, a compound having at least any one or more of nickel, iron, manganese, and cobalt is preferable. These are expressed by the chemical formula such as, for example, $Li_xM1O_2$ or $Li_yPO_4$. In the formulae, M1 and M2 represent at least any one or more of transition metal elements. The values of x and y are different in the charge or discharge state of the battery; but they are generally $0.05 \leq x \leq 1.10$ and $0.05 \leq y \leq 1.10$.

Example of the composite oxide composed of lithium and a transition metal element include a lithium cobalt composite oxide ($Li_xCoO_2$) and a lithium nickel composite oxide ($Li_xNiO_2$). Example of the phosphate compound having lithium and a transition metal element include a lithium iron phosphate compound ($LiFePO_4$) or a lithium iron manganese phosphate compound ($LiFe_{1-u}Mn_uPO_4$ (0<u<1)). This is because when these positive electrode materials are used, not only a high battery capacity but also an excellent cycle characteristics can be obtained.

[Negative Electrode]

The negative electrode has the same composition as that of the above negative electrode 10 for a lithium ion secondary battery shown in FIG. 1, whereby having, for example, the negative electrode active material layer 12 on both surfaces of the current collector 11. In this negative electrode, it is preferable that the negative electrode charge capacity is greater than the electric capacity (charge capacity as the battery) obtained from the positive electrode active material. This is because deposition of the lithium metal on the negative electrode can be suppressed.

The positive electrode active material layer is arranged on part of both surfaces of the positive electrode current collector; and also, the negative electrode active material layer is arranged on part of both surfaces of the negative electrode current collector. In this case, for example, in the negative electrode active material layer formed on the negative electrode current collector, there is an area in which there is no positive electrode active material layer facing thereto. This is because a stable battery is to be designed.

In the non-facing area, namely, in the area in which the negative electrode active material layer does not face to the positive electrode active material layer, there is hardly an effect of charge and discharge. Because of this, the state of the negative electrode active material layer immediately after formation thereof can be maintained as it is. Accordingly, the composition of the negative electrode active material and the like can be accurately and reproducibly studied without depending on charge and discharge.

[Separator]

The separator separates between the negative electrode and the positive electrode, and allows for the lithium ion to pass through it while preventing the short circuit due to contacts of both electrodes. This separator is formed of, for example, a synthetic resin or a porous film formed of ceramic, wherein it may have a laminate structure of two or more porous films. Examples of the synthetic resin include polytetrafluoroethylene, polypropylene, polyethylene and the like.

[Electrolyte Solution]

In at least part of the active material layer or in the separator, a liquid electrolyte (electrolyte solution) is impregnated. In this electrolyte solution, an electrolyte salt is dissolved in a solvent, wherein other material such as an additive may be included.

As to the solvent, for example, a non-aqueous solvent may be used. Examples of the non-aqueous solvent include ethylene carbonate, propylene carbonate, butylene carbonate, dimethyl carbonate, diethyl carbonate, ethyl methyl carbonate, methyl propyl carbonate, 1,2-dimethoxyethane, tetrahydrofuran and the like. Among them, at least any one or more of ethylene carbonate, propylene carbonate, dimethyl carbonate, diethyl carbonate, and ethyl methyl carbonate is preferably used. This is because better characteristics can be obtained. In this case, when a high viscous solvent such as ethylene carbonate, propylene carbonate or the like is combined with a low viscous solvent such as dimethyl carbonate, ethyl methyl carbonate, diethyl carbonate or the like better characteristics can be obtained. This is because dissociation of the electrolyte salt as well as ion mobility can be enhanced.

When an alloy-based negative electrode is used, especially as the solvent, it is preferable to include at least any one of a halogenated linear carbonate ester or a halogenated cyclic carbonate ester. With this, during charging and discharging, especially during charging, a stable film is formed on the negative electrode active material surface. Meanwhile, the halogenated chain carbonate ester is a linear carbonate ester having a halogen as the constituent element thereof (at least one hydrogen atom thereof is substituted with a halogen). The halogenated cyclic carbonate ester is a cyclic carbonate ester having a halogen as the constituent element thereof (at least one hydrogen atom thereof is substituted with a halogen).

The halogen is not particularly restricted; however, fluorine is preferable. This is because a better film than the film containing other halogen is formed. In addition, the larger the number of halogen is the more desirable. This is because the obtained film is more stable so that the decomposition reaction of the electrolyte solution can be suppressed.

Examples of the halogenated linear carbonate ester include fluoromethyl methyl carbonate, difluoromethyl methyl carbonate and the like. Examples of the halogenated cyclic carbonate ester include 4-fluoro-1,3-dioxolane-2-one, 4,5-difluoro-1,3-dioxolane-2-one and the like.

It is preferable to include as a solvent additive a cyclic carbonate ester having an unsaturated carbon bond. This is because a stable film is formed on the negative electrode surface during charging and discharging, so that the decomposition reaction of the electrolyte solution can be suppressed. Examples of the cyclic carbonate ester having an unsaturated carbon bond include vinylene carbonate, vinyl ethylene carbonate and the like.

In addition, it is preferable to include a sultone (cyclic sulfonate ester) as the solvent additive. This is because a chemical stability of the battery can be enhanced. Example of the sultone include, for example, propane sultone and propene sultone.

In addition, it is preferable that the solvent includes an acid anhydride. This is because a chemical stability of the electrolyte solution can be enhanced. Examples of the acid anhydride include, for example, propane disulfonic anhydride.

The electrolyte solution can include any one or more of a light metal salt such as, for example, a lithium salt. Example of the lithium salt includes lithium hexafluorophosphate ($LiPF_6$) and lithium terafluoroborate ($LiBF_4$).

Content of the electrolyte salt is preferably 0.5 mol/kg or more and 2.5 mol/kg or lower relative to the solvent. This is because a high ionic conductivity can be obtained.

[Method for Producing the Laminate Film Type Secondary Battery]

In the present invention, the negative electrode is produced by using the negative electrode active material that is produced by the method for producing the negative electrode active material of the present invention, which is then followed by production of the lithium ion secondary battery by using the negative electrode thus produced.

At first, the positive electrode is produced by using the positive electrode material as mentioned above. First, the positive electrode active material is mixed, as needed, with a binder, a conductive additive and the like to obtain the positive electrode mixture, which is then dispersed into an organic solvent to obtain a slurry of the positive electrode mixture. Next, the mixture slurry is applied onto the positive electrode current collector by using a coating machine such as a die coater having a knife roll or a die head, and then, it is dried by a hot air to obtain the positive electrode active material layer. Finally, the positive electrode active material layer is press molded by a roll press machine or the like. At this time, it may be heated, or alternatively, heating or pressing may be repeated for plural times.

Next, by following the same working procedure as production of the lithium ion secondary battery negative electrode 10, the negative electrode active material layer is formed on the negative electrode current collector to obtain the negative electrode.

Upon producing the positive electrode and the negative electrode, the active material layer of each is formed on both surfaces of the positive electrode and negative electrode current collectors. At this time, the active material coating length of the both surface portions may be displaced in any of the electrodes (see, FIG. 1).

Next, the electrolyte solution is prepared. Next, by an ultrasonic welding or the like, the positive electrode lead 22 is attached to the positive electrode current collector, and also the negative electrode lead 23 is attached to the negative electrode current collector. Next, the positive electrode and the negative electrode are laminated or rolled via the separator to obtain the rolled electrode body 21, which is then followed by adhesion of the protection film on the outermost peripheral portion thereof. Next, the rolled body is molded so as to be a flat form. Next, after the rolled electrode body is sandwiched between the exterior members 25 in a film-like form and folded, the insulation portions of the exterior members are adhered to each other by a thermal adhesion method so as to seal the rolled electrode body with an open state only in one direction. The close adhesion films are inserted between the exterior member and the positive electrode lead and between the exterior member and the negative electrode lead. After the predetermined amount of the electrolyte solution previously prepared is charged from the open portion, vacuum impregnation is carried out. After the impregnation, the open portion is adhered by a vacuum thermal adhesion. In the way as mentioned above, the laminate film type lithium ion secondary battery 20 can be produced.

EXAMPLE

In what follows, the present invention will be explained more specifically by showing Examples and Comparative Examples of the present invention; but the present invention is not limited to these Examples.

Example 1-1

According to the following procedure, the laminate film type lithium ion secondary battery 20 shown in FIG. 4 was produced.

First, the positive electrode was produced. The positive electrode mixture was prepared by mixing 95% by mass of $LiNi_{0.7}Co_{0.25}Al_{0.05}O$, which is a lithium nickel cobalt composite oxide as the positive electrode active material, 2.5% by mass of the positive electrode conductive additive, and 2.5% by mass of the positive electrode binder (polyvinylidene fluoride: PVDF). Next, the positive electrode mixture was dispersed into the organic solvent (N-methyl-2-pyrrolidone; NMP) to obtain a slurry in a paste form. Next, by using a coating machine having a die head, the slurry was applied onto both surfaces of the positive electrode current collector, and then, it was dried with a hot air drying equipment. At this time, the positive electrode current collector having a thickness of 15 μm was used. Finally, the press molding thereof was carried out by a roll press.

Next, the negative electrode was prepared. First, the negative electrode active material was prepared as follows. A mixture of metal silicon and silicon oxide was introduced as the raw material into a reaction furnace, and the mixture was vaporized in an atmosphere with the vacuum degree of 10 Pa so as to be deposited onto an adsorption plate. After the deposited material was sufficiently cooled down, it was taken out and crushed by a ball mill. The x value of $SiO_x$ of the silicon compound particles thus obtained was 0.5. Next, the particle diameter of the silicon compound particles was adjusted by classification. Thereafter, by carrying out the thermal decomposition CVD, surface of the silicon compound particles was covered with the carbon material. This was used as the negative electrode active material particles.

Next, lithium was inserted into the negative electrode active material particles by the thermal doping method to carry out the modification. First, under an Ar atmosphere, the LiH powder and the negative electrode active material particles were mixed sufficiently well, and then, the resulting mixture was sealed in a vessel. Then, the whole vessel thus sealed was stirred so as to make the mixture uniform. Thereafter, heating thereof was carried out at 700 to 750° C. to carry out the modification. In order to release part of active Li from the silicon compound, the negative electrode active material particles after heating was sufficiently cooled down, and then, it was washed with an alcohol. By the treatment as mentioned above, Li was inserted into the negative electrode active material particles.

Next, the negative electrode active material particles and the carbon-based active material were blended with the mass ratio of 1:9 to obtain the negative electrode active material. Meanwhile, as to the carbon-based active material, a mixture of natural graphite and artificial graphite covered with a pitch layer with the mass ratio of 5:5 was used. The median diameter of the carbon-based active material was 20 μm.

Next, the negative electrode active material thus obtained, the conductive additive 1 (carbon nanotube; CNT), the conductive additive 2 (carbon fine particles with the median diameter of about 50 nm), the styrene butadiene rubber (styrene-butadiene copolymer; hereinafter, this is referred to as SBR), and the carboxymethyl cellulose (hereinafter, this is referred to as CMC) were mixed with the dry mass ratio of 92.5:1:1:2.5:3; and then, the resulting mixture was diluted with pure water to obtain the negative electrode mixture slurry. Meanwhile, SBR and CMC mentioned above are the negative electrode binders.

As to the negative electrode current collector, an electrolysis copper foil with the thickness of 15 μm was used. In this electrolysis copper foil, carbon and sulfur were included each with the concentration of 70 ppm by mass. Finally, the negative electrode mixture slurry was applied onto the negative electrode current collector; and then, it was dried under vacuum atmosphere at 100° C. for 1 hour. The deposition amount of the negative electrode active material layer per a unit area in one surface of the negative electrode after drying was 5 mg/cm$^2$ (this is also referred to as the area density).

Next, after the solvents (4-fluoro-1,3-dioxolane-2-one (FEC), ethylene carbonate (EC), and dimethyl carbonate (DMC)) were mixed, the electrolyte salt (lithium hexafluorophosphate: LiPF$_6$) was dissolved into this solvent mixture to obtain the electrolyte solution. In this case, the solvent composition of FEC:EC:DMC=10:20:70 as the deposition ratio was used while the content of the electrolyte salt was 1.2 mol/kg relative to the solvent.

Next, the secondary battery was fabricated as follows. First, an aluminum lead was attached to one end of the positive electrode current collector with an ultrasonic welding, and also a nickel lead was welded to one end of the negative electrode current collector. Next, the positive electrode, the separator, the negative electrode, and the separator were laminated in this order, and wound in the longitudinal direction to obtain a wound electrode body. The winding end portion thereof was fixed by a PET protection tape. As to the separator, a laminate film formed by sandwiching the film mainly comprising porous polyethylene with the films mainly comprising porous polypropylene was used (thickness of 12 μm). Next, after the electrode body was sandwiched by the exterior members, the outer peripheral portions thereof except for one side were thermally adhered to each other so as to store the electrode body therein. As to the exterior member, the aluminum laminate film formed by laminating a nylon film, an aluminum foil, and a polypropylene film was used. Next, from the open portion, the prepared electrolyte solution was charged; and after impregnation was carried out under vacuum atmosphere, the open portion was sealed by thermal adhesion.

The cycle characteristics and the first time charge and discharge characteristics of the secondary battery thus fabricated were evaluated.

The cycle characteristics was studied as follows. First, in order to stabilize the battery, two cycles of charge and discharge were carried out at the atmospheric temperature of 25° C. with 0.2 C; and the discharge capacity at the second cycle was measured. Next, the charge and discharge were carried out until the total cycle number reached 499 cycles, wherein the discharge capacity was measured at each cycle. Finally, the discharge capacity at the 500$^{th}$ cycle obtained with the 0.2 C charge and discharge was divided with the discharge capacity at the second cycle to calculate the capacity retention rate (hereinafter, this is sometimes referred to as simply "retention rate"). In the normal cycle, namely, from the 3rd cycle to the 499$^{th}$ cycle, the charge and discharge were done with the 0.7 C charge and the 0.5 C discharge.

To study the first time charge and discharge characteristics, the first time efficiency (hereinafter, this is sometimes referred to as the initial efficiency), the first time efficiency was calculated from the equation, first time efficiency (%)= (first time discharge capacity/first time charge capacity)× 100. The atmospheric temperature was as same as that used in the study of the cycle characteristics.

Example 1-2 to Example 1-3 and Comparative Examples 1-1 and 1-2

The secondary battery was fabricated in the same way as Example 1-1, except that the oxygen amount in the bulk of the silicon compound was controlled. In this case, the oxygen amount was controlled by changing the ratio of metal silicon to silicon dioxide in the silicon compound raw material as well as by changing the heating temperature. The x values of the silicon compounds expressed by SiO$_x$ in Examples 1-1 to 1-3 and Comparative Examples 1-1 and 1-2 are shown in Table 1.

At this time, the silicon-based active material particles of Examples 1-1 to 1-3 and Comparative Examples 1-1 and 1-2 had the following properties. Inside the silicon compound particles in the negative electrode active material particles, Li$_2$SiO$_3$ and Li$_4$SiO$_4$ were included. Furthermore, the median diameter D$_{50}$ of the negative electrode active material particles was 4.0 μm. Furthermore, in the silicon compound, the half-value width (2θ) of the diffraction peak derived from the Si(111) crystal plane obtained from the X-ray diffraction was 1.755°, and the crystallite's size derived from the Si(111) crystal plane was 4.86 nm.

Furthermore, in all of Examples and Comparative Examples shown above, the peaks in the Si and lithium silicate regions given as the chemical shift value of −60 ppm to −95 ppm were appeared in the $^{29}$Si-MAS-NMR spectrum. In all of Examples and Comparative Examples shown above, the relationship A>B was satisfied, wherein A is a maximum peak strength value in the Si and Li silicate regions given as the chemical shift value of −60 ppm to −95 ppm and B is a peak strength value in the SiO$_2$ region given as a chemical shift value of −96 ppm to −150 ppm, these values being obtained from a $^{29}$Si-MAS-NMR spectrum.

Furthermore, the average thickness of the carbon material included in the negative electrode active material particles was 100 nm. Furthermore, in the negative electrode active material particles, the loose bulk density BD was 0.7 g/cm$^3$, the tapped bulk density TD was 0.85 g/cm$^3$, and the compression degree defined as (TD-BD)/TD was 17.6%.

In the negative electrode active material particles, the circularity (Lc/Lp) in a particle group of 5000 or more particles arbitrarily extracted from the negative electrode active material particles was an average 0.97, and the rate of particles having the circularity of 0.85 or less was 1%. Furthermore, the aspect ratio (Dl/Ds) in a particle group of 5000 or more particles arbitrarily extracted from the negative electrode active material particles was an average 1.1.

From the negative electrode prepared as described above and the counter electrode lithium, a coin type test cell with the size of 2032 was fabricated; and the discharge behavior thereof was evaluated. More specifically, first, the constant current and constant voltage charge was carried out to 0 V in the counter Li; and when the current density reached 0.05 mA/cm$^2$, the charge was stopped. Thereafter, the constant current discharge was carried out to 1.2 V. The current density at this time was 0.2 mA/cm$^2$. This charge and discharge was repeated for 30 times; and from the data in each charge and discharge, the graph was plotted wherein the capacity change rate (dQ/dV) is shown in the vertical axis and the voltage (V) is shown in the horizontal axis so as to confirm whether or not a peak is obtained in the range of 0.4 to 0.55 (V). As a result, in Comparative Example 1 in which x in SiO$_x$ is less than 0.5, the above-mentioned peak could not be obtained. In other Examples and Comparative Examples, the peak could be obtained in the charge and discharge within 30 times; and moreover, the peak could be obtained in every charge and discharge from the charge and discharge in which the peak was observed for the first time till the 30$^{th}$ charge and discharge.

Evaluation results of Examples 1-1 to 1-3 and Comparative Examples 1-1 and 1-2 are shown in Table 1.

TABLE 1

|  | x | Capacity retention rate (%) | Initial efficiency (%) |
|---|---|---|---|
| Comparative Example 1-1 | 0.3 | 47 | 88.3 |
| Example 1-1 | 0.5 | 80.6 | 86.9 |
| Example 1-2 | 1 | 81.3 | 87.4 |
| Example 1-3 | 1.6 | 80.7 | 87.0 |
| Comparative Example 1-2 | 1.8 | — | — |

SiO$_x$: D$_{50}$ = 4 μm,
graphite: (natural graphite:artificial graphite = 5:5), D$_{50}$ = 20 μm,
SiO$_x$ ratio: 10% by mass, Li$_2$SiO$_3$ and Li$_4$SiO$_4$,
carbon material: average thickness 100 nm,
dQ/dV: yes,
half-value width: 1.755°,
crystallite: 4.86 nm,
modification method: thermal doping, A > B, BD = 0.7, TD = 0.85,
compression degree: 17.6%, average Lc/Lp = 0.97,
Lc/Lp ≤ 0.85: 1%, Dl/Ds = 1.1

As shown in Table 1, in the silicon compound represented by SiO$_x$, when the value of x is outside 0.5≤x≤1.6, the battery characteristics were deteriorated. For example, as shown in Comparative Example 1-1, when there was no sufficient oxygen (x=0.3), the capacity retention rate was drastically deteriorated even though the first time efficiency was increased. On the other hand, as shown in Comparative Example 1-2, when there is much oxygen (x=1.8), the conductivity was degraded that substantially the capacity of the silicon oxide did not appear; and thus, the evaluation was stopped.

Example 2-1 and Example 2-2

The secondary battery was fabricated with the same condition as Example 1-2 except that the lithium silicates included inside the silicon compound particles were changed as shown in Table 2; and then, the cycle characteristics and the first time efficiency were evaluated.

Comparative Example 2-1

The secondary battery was fabricated with the same condition as Example 1-2 except that lithium was not inserted into the silicon compound particles; and then, the cycle characteristics and the first time efficiency were evaluated.

Results of Example 2-1, Example 2-2, and Comparative Example 2-1 are summarized in Table 2.

TABLE 2

|  | Lithium silicate | Capacity retention rate (%) | Initial efficiency (%) |
|---|---|---|---|
| Example 2-1 | Li$_2$SiO$_3$ | 80.4 | 86.7 |
| Example 2-2 | Li$_4$SiO$_4$ | 80.3 | 86.8 |
| Example 1-2 | Li$_2$SiO$_3$, Li$_4$SiO$_4$ | 81.3 | 87.4 |
| Comparative Example 2-1 | — | 78.0 | 82.5 |

SiO$_x$: x = 1, D$_{50}$ = 4 μm,
graphite: (natural graphite:artificial graphite = 5:5), D$_{50}$ = 20 μm,
SiO$_x$ ratio: 10% by mass,
carbon material: average thickness 100 nm,
dQ/dV: yes,
half-value width: 1.755°,
crystallite: 4.86 nm,
modification method: thermal doping, A > B, BD = 0.7, TD = 0.85,
compression degree: 17.6%, average Lc/Lp = 0.97,
Lc/Lp ≤ 0.85: 1%, Dl/Ds = 1.1

When the silicon compound included the stable lithium silicates such as Li$_2$SiO$_3$ and Li$_4$SiO$_4$, the capacity retention rate as well as the initial efficiency could be enhanced. Especially when both Li$_2$SiO$_3$ and Li$_4$SiO$_4$ were included, the capacity retention rate as well as the initial efficiency could be enhanced furthermore. On the other hand, in Comparative Example 2-1 in which modification was not carried out as the silicon compound did not include lithium, the capacity retention rate and the initial efficiency were deteriorated.

Examples 3-1 to 3-4 and Comparative Examples 3-1 to 3-7

The secondary battery was fabricated with the same condition as Example 1-2 except that the loose bulk density BD and the tapped bulk density TD were controlled as shown in Table 3; and then, the cycle characteristics and the first time efficiency were evaluated. BD and TD were controlled by changing the crushing step, the classification step, and the washing step in the thermal doping method.

Results of Examples 3-1 to 3-4 and Comparative Examples 3-1 to 3-7 are shown in Table 3.

TABLE 3

|  | BD (g/cm$^3$) | TD (g/cm$^3$) | Compression degree (%) | Capacity retention rate (%) | Initial efficiency (%) |
|---|---|---|---|---|---|
| Example 3-1 | 0.90 | 1.20 | 25.0 | 81.1 | 87.3 |
| Example 3-2 | 0.84 | 0.98 | 14.3 | 81.2 | 87.4 |
| Example 1-2 | 0.70 | 0.85 | 17.6 | 81.3 | 87.4 |
| Example 3-3 | 0.61 | 0.72 | 16.4 | 81.3 | 87.5 |
| Example 3-4 | 0.53 | 0.70 | 24.3 | 81.2 | 87.4 |
| Comparative Example 3-1 | 0.60 | 0.84 | 28.6 | 80.1 | 86.4 |
| Comparative Example 3-2 | 0.48 | 0.70 | 31.4 | 79.7 | 85.8 |

TABLE 3-continued

| | BD (g/cm³) | TD (g/cm³) | Compression degree (%) | Capacity retention rate (%) | Initial efficiency (%) |
|---|---|---|---|---|---|
| Comparative Example 3-3 | 0.90 | 1.21 | 25.6 | 79.8 | 86.1 |
| Comparative Example 3-4 | 1.00 | 1.23 | 18.7 | 80.2 | 86.1 |
| Comparative Example 3-5 | 0.55 | 0.67 | 17.9 | 80.3 | 85.9 |
| Comparative Example 3-6 | 0.42 | 0.63 | 33.3 | 78.7 | 84.9 |
| Comparative Example 3-7 | 0.95 | 1.30 | 26.9 | 79.0 | 84.2 |

$SiO_x$: x = 1, $D_{50}$ = 4 μm,
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: average thickness 100 nm,
dQ/dV: yes,
half-value width: 1.755°,
crystallite: 4.86 nm,
modification method: thermal doping, A > B As shown in Table 3, in Examples 3-1 to 3-4 in which the conditions that the loose bulk density BD is 0.5 g/cm³ or more and 0.9 g/cm³ or less, the tapped bulk density TD is 0.7 g/cm³ or more and 1.2 g/cm³ or less, and the compression degree is 25% or less were satisfied, the capacity retention rate as well as the initial efficiency could be enhanced as compared with Comparative Examples 3-1 to 3-7 in which these conditions were not satisfied.

Example 4-1 to Example 4-4

The secondary battery was fabricated with the same condition as Example 1-2 except that the average value of the circularity (Lc/Lp) of the particle group of 5000 or more particles arbitrarily extracted from the negative electrode active material particles, the rate of the particles having the circularity of 0.85 or less, and the aspect ratio (Dl/Ds) were changed as shown in Table 4 by changing the conditions of the crushing step and the classification step; and then, the cycle characteristics and the first time efficiency were evaluated. Meanwhile, the negative electrode active material particles of Example 4-1 to Example 4-4 satisfied 0.5≤BD≤0.9, 0.7≤TD≤1.2, and the compression degree≤25%.

TABLE 4

| | Average Lc/Lp | Ratio of Lc/Lp ≤ 0.85 (%) | Average Dl/Ds | Capacity retention rate (%) | Initial efficiency (%) |
|---|---|---|---|---|---|
| Example 1-2 | 0.97 | 1 | 1.1 | 81.3 | 87.4 |
| Example 4-1 | 0.93 | 4 | 1.2 | 81.2 | 87.4 |
| Example 4-2 | 0.88 | 8 | 1.5 | 80.9 | 86.9 |
| Example 4-3 | 0.88 | 8 | 1.3 | 81.1 | 87.0 |
| Example 4-4 | 0.95 | 3 | 1.5 | 81.0 | 87.2 |

$SiO_x$: x = 1, $D_{50}$ = 4 μm,
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: average thickness 100 nm,
dQ/dV: yes,
half-value width: 1.755°,
crystallite: 4.86 nm,
modification method: thermal doping, A > B, 0.5 ≤ BD ≤ 0.9, 0.7 ≤ TD ≤ 1.2, compression degree ≤25%

As can be seen in Table 4, in Examples 1-2, 4-1, and 4-4 in which the conditions that the average value of Lc/Lp is 0.93 or more and the rate of the particles with Lc/Lp being 0.85 or less is 5% or less were satisfied, the initial efficiency was increased as compared with Examples 4-2 and 4-3 in which these conditions were not satisfied.

In addition, as shown in Table 4, in Examples 1-2, 4-1, and 4-3 in which the condition that the average value of Dl/Ds is 1 or more and 1.4 or less was satisfied, the capacity retention rate was increased as compared with Examples 4-2 and 4-4 in which this condition was not satisfied.

Examples 5-1 to 5-6

The secondary battery was fabricated with the same condition as Example 1-2 except that the crystallinity of the silicon compound particles was changed as shown in Table 5; and then, the cycle characteristics and the first time efficiency were evaluated. Meanwhile, the crystallinity in the silicon compound particles can be controlled by changing the temperature to vaporize of the raw materials or the heat treatment after generation of the silicon compound particles.

TABLE 5

| | half-value width (°) | Si (111) crystallite size (nm) | Capacity retention rate (%) | Initial efficiency (%) |
|---|---|---|---|---|
| Example 5-1 | 0.756 | 11.42 | 79.5 | 87.8 |
| Example 5-2 | 0.796 | 10.84 | 79.8 | 87.8 |
| Example 5-3 | 1.025 | 8.55 | 80.0 | 87.6 |
| Example 5-4 | 1.218 | 7.21 | 80.2 | 87.5 |
| Example 5-5 | 1.271 | 6.63 | 80.6 | 87.6 |
| Example 1-2 | 1.755 | 4.86 | 81.3 | 87.4 |
| Example 5-6 | 2.593 | 3.29 | 81.5 | 87.4 |

$SiO_x$: x = 1, $D_{50}$ = 4 μm,
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: average thickness 100 nm,
dQ/dV: yes,
modification method: thermal doping, A > B, BD = 0.7, TD = 0.85,
compression degree: 17.6%, average Lc/Lp = 0.97,
Lc/Lp ≤ 0.85: 1%, Dl/Ds = 1.1

Especially when the half-value width was 1.2° or more and the crystallite's size derived from the Si(111) plane was 7.5 nm or less, namely in the material with low crystallinity, a high capacity retention rate could be obtained.

Example 6-1

The secondary battery was fabricated with the same condition as Example 1-2 except that in the silicon compound particles the relationship between the maximum peak strength value A in the Si and Li silicate regions and the peak strength value B derived from the $SiO_2$ region was made to satisfy A<B; and then, the cycle characteristics and the first time efficiency were evaluated. In this case, by reducing the insertion amount of Li upon modification thereby reducing the $Li_2SiO_3$ amount, the peak strength A derived from $Li_2SiO_3$ was made weak.

TABLE 6

|  | A, B | Capacity retention rate (%) | Initial efficiency (%) |
| --- | --- | --- | --- |
| Example 6-1 | A < B | 80.6 | 86.4 |
| Example 1-2 | A > B | 81.3 | 87.4 |

$SiO_x$: $D_{50}$ = 4 μm,
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: average thickness 100 nm,
dQ/dV: yes,
half-value width: 1.755°,
crystallite: 4.86 nm,
modification method: thermal doping, BD = 0.7, TD = 0.85,
compression degree: 17.6%, average Lc/Lp = 0.97,
Lc/Lp ≤ 0.85: 1%, Dl/Ds = 1.1

As shown in Table 6, when the relationship of the peak strengths satisfies A>B, the battery characteristics could be enhanced.

Example 7-1

The secondary battery was fabricated with the same condition as Example 1-2 except that the negative electrode active material which did not give the peak in the range of 0.40 to 0.55 V in any charge and discharge in the V–dQ/dV curve obtained in 30 charges and discharges in the test cell was used; and then, the cycle characteristics and the first time efficiency were evaluated.

TABLE 7

|  | dQ/dV peak | Capacity retention rate (%) | Initial efficiency (%) |
| --- | --- | --- | --- |
| Example 7-1 | Absent | 80.8 | 87.0 |
| Example 1-2 | Present | 81.3 | 87.4 |

$SiO_x$: $D_{50}$ = 4 μm,
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: average thickness 100 nm,
dQ/dV: yes,
half-value width: 1.755°,
crystallite: 4.86 nm,
modification method: thermal doping, A > B, BD = 0.7, TD = 0.85,
compression degree: 17.6%, average Lc/Lp = 0.97,
Lc/Lp ≤ 0.85: 1%, Dl/Ds = 1.1

In order that the discharge curve rises more sharply, the silicon compound ($SiO_x$) needs to show the same discharge behavior as silicon (Si). The silicon compound not having the peak appeared in the above-mentioned range in 30 charges and discharges had a comparatively gentle discharge curve, so that a slight decrease was resulted in the initial efficiency upon making the secondary battery. When the peak appeared within 30 charges and discharges, a stable bulk could be formed so that the capacity retention rate as well as the initial efficiency could be enhanced.

Examples 8-1 to 8-6

The secondary battery was fabricated with the same condition as Example 1-2 except that the median diameter of the silicon compound was changed as shown in Table 8; and then, the cycle characteristics and the first time efficiency were evaluated.

TABLE 8

|  | Median diameter (μm) | Capacity retention rate (%) | Initial efficiency (%) |
| --- | --- | --- | --- |
| Example 8-1 | 0.1 | 79.9 | 87.1 |
| Example 8-2 | 0.5 | 80.8 | 87.2 |
| Example 8-3 | 1 | 81.1 | 87.3 |
| Example 1-2 | 4 | 81.3 | 87.4 |
| Example 8-4 | 10 | 80.7 | 87.5 |
| Example 8-5 | 15 | 80.5 | 87.4 |
| Example 8-6 | 20 | 80.1 | 87.3 |

$SiO_x$: x = 1
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: average thickness 100 nm,
dQ/dV: yes,
half-value width: 1.755°,
crystallite: 4.86 nm,
modification method: thermal doping, A > B, BD = 0.7, TD = 0.85,
compression degree: 17.6%, average Lc/Lp = 0.97,
Lc/Lp ≤ 0.85: 1%, Dl/Ds = 1.1

When the median diameter of the silicon compound was 0.5 μm or more, the retention rate could be enhanced. This is presumably because the surface area of the silicon compound per unit mass was not too large that the area to cause a side reaction could be made small. On the other hand, when the median diameter is 15 μm or less, the particle does not readily crack upon charging so that SEI (solid electrolyte interface) due to the new surface is difficult to be formed upon charging and discharging; and thus, the reversible Li loss can be suppressed. In addition, when the median diameter of the silicon-based active material particles is 15 μm or less, expansion amount of the silicon compound particles upon charging is not so much that physical and electrical destruction of the negative electrode active material layer due to expansion can be prevented.

Examples 9-1 to 9-4

The secondary battery was fabricated with the same condition as Example 1-2 except that the average thickness of the carbon material which covers surface of the silicon-based active material particles was changed; and then, the cycle characteristics and the first time efficiency were evaluated. The average thickness of the carbon material can be controlled by changing the CVD condition.

TABLE 9

|  | Average thickness (nm) | Capacity retention rate (%) | Initial efficiency (%) |
| --- | --- | --- | --- |
| Example 9-1 | 5 | 79.7 | 87.1 |
| Example 9-2 | 10 | 80.8 | 87.4 |
| Example 1-2 | 100 | 81.3 | 87.4 |
| Example 9-3 | 1000 | 81.1 | 87.6 |
| Example 9-4 | 5000 | 81.0 | 87.6 |

$SiO_x$: x = 1, $D_{50}$ = 4 μm,
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: yes,
dQ/dV: yes,
half-value width: 1.755°,
crystallite: 4.86 nm,
modification method: thermal doping, A > B, BD = 0.7, TD = 0.85,
compression degree: 17.6%, average Lc/Lp = 0.97,
Lc/Lp ≤ 0.85: 1%, Dl/Ds = 1.1

As shown in Table 9, when the film thickness of the carbon layer is 10 nm or more, especially the conductivity increases so that the capacity retention rate as well as the initial efficiency can be enhanced. On the other hand, when the film thickness of the carbon layer is 5000 nm or less, amount of the silicon compound particles can be satisfactorily secured upon designing, so that the battery capacity does not decrease.

Example 10-1

The secondary battery was fabricated with the same condition as Example 1-2 except that the modification method was changed to the oxidation and reduction method; and then, the cycle characteristics and the first time efficiency were evaluated.

Modification by the oxidation and reduction method was carried out as follows. First, the negative electrode active material particles were soaked in the solution (solution $A_1$) in which a lithium piece and biphenyl, which is a linear polyphenylene compound, were dissolved in tetrahydrofuran (hereinafter, this is sometimes referred to as THF). The solution $A_1$ was prepared in the way that after biphenyl was dissolved into the THF solvent so as to give the concentration of 1 mol/L, a lithium piece with the mass of 10% by mass relative to the mixed solution of THF and biphenyl was added into this solution. Meanwhile, temperature of the solution upon soaking the negative electrode active material particles thereinto was 20° C., and the soaking period was 10 hours. Thereafter, the negative electrode active material particles were collected by filtration. By the procedure mentioned above, lithium was inserted into the negative electrode active material particles.

Next, the negative electrode active material particles after insertion of lithium were soaked into the solution in which naphthalene was dissolved in THF (solution B). This solution B was prepared by dissolving naphthalene into the THF solvent so as to give the concentration of 2 mol/L. Meanwhile, temperature of the solution upon soaking the negative electrode active material particles thereinto was 20° C., and the soaking period was 20 hours. Thereafter, the negative electrode active material particles were collected by filtration.

Next, the negative electrode active material particles after having been contacted with the solution B was soaked into the solution (solution C) in which p-benzoquinone was dissolved into THF so as to give the concentration of 1 mol/L. The soaking period was 2 hours. Thereafter, the negative electrode active material particles were collected by filtration.

Next, the negative electrode active material particles were subjected to the washing treatment; and the negative electrode active material particles after the washing treatment were subjected to the drying treatment under a reduced pressure. Thus, the negative electrode active material particles were modified.

TABLE 10

| | half-value width (°) | Si (111) crystallite size (nm) | Modification method | Capacity retention rate (%) | Initial efficiency (%) |
|---|---|---|---|---|---|
| Example 1-2 | 1.755 | 4.86 | Thermal doping | 81.3 | 87.4 |
| Example 10-1 | 2.257 | 3.77 | Oxidation and reduction | 81.0 | 87.5 |

$SiO_x$: $D_{50}$ = 4 μm,
graphite: (natural graphite:artificial graphite = 5:5), $D_{50}$ = 20 μm,
$SiO_x$ ratio: 10% by mass, $Li_2SiO_3$ and $Li_4SiO_4$,
carbon material: average thickness 100 nm,
dQ/dV: yes, A > B, BD = 0.7, TD = 0.85,
compression degree: 17.6%, average Lc/Lp = 0.97,
Lc/Lp ≤ 0.85: 1%, Dl/Ds = 1.1

With the oxidation and reduction method, too, excellent capacity retention rate and initial efficiency could be obtained.

Example 11-1

The secondary battery was fabricated with the same condition as Example 1-2 except that the mass ratio of the silicon-based active material particles in the negative electrode active material was changed; and then, the rate of increase in the battery capacity was evaluated.

Figure 5:
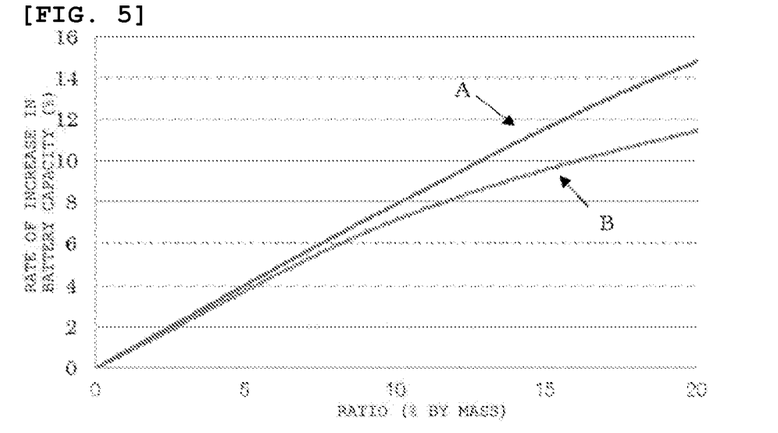
FIG. 5 is a diagram showing the relationship between the ratio of the silicon-based active material particles to the total amount of the negative electrode active material and the rate of increase in the battery capacity of the secondary battery.

In FIG. 5, the graph is shown in which the relationship between the ratio of the silicon-based active material particles to the total amount of the negative electrode active material and the rate of increase in the battery capacity of the secondary battery is shown. The graph in A of FIG. 5 shows the rate of increase in the battery capacity when the ratio of the silicon compound particles in the negative electrode active material of the negative electrode of the present invention is increased. On the other hand, the graph in B of FIG. 5 shows the rate of increase in the battery capacity when the ratio of the silicon compound particles not doped with Li is increased. As can be seen in FIG. 5, when the ratio of the silicon compound is 6% or more by mass, the rate of increase in the battery capacity is larger as compared with the conventional case, so that especially the volume energy density increases eminently.

By the way, it must be noted here that the present invention is not limited to the embodiments as described above. The embodiments are mere examples; any form having substantially the same composition as the technical idea described in claims of the present invention and showing similar effects is included in the technical scope of the present invention.

The invention claimed is:

1. A negative electrode active material, wherein the negative electrode active material is a negative electrode active material comprising negative electrode active material particles;
   the negative electrode active material particles comprise silicon compound particles comprising a silicon compound ($SiO_x$: 0.5≤x≤1.6);
   the silicon compound particles include at least any one kind or more kinds of $Li_2SiO_3$ and $Li_4SiO_4$;
   the negative electrode active material particles have a loose bulk density BD of 0.5 g/cm$^3$ or more and 0.9 g/cm$^3$ or less, a tapped bulk density TD of 0.7 g/cm$^3$ or more and 1.2 g/cm$^3$ or less, and a compression degree of 25% or less, the compression degree being defined by (TD-BD)/TD.

2. The negative electrode active material according to claim 1, wherein in the negative electrode active material particles, a circularity Lc/Lp, defined by a ratio of Lc, which is a circumferential length of a circle having the same projected area as a particle, to Lp, which is a circumferential length of the particle, the circularity Lc/Lp being calculated from an image analysis of particle picture of the negative electrode active material particles, is an average 0.93 or more in a particle group of 5000 or more particles arbitrarily extracted from the negative electrode active material particles, as well as a rate of particles having the circularity of 0.85 or less is 5% or less.

3. The negative electrode active material according to claim 1, wherein in the negative electrode active material particles, a ratio Dl/Ds, which is a ratio of Dl, a long diameter of a particle, to Ds, a short diameter of a particle, the ratio Dl/Ds being calculated from an image analysis of particle picture of the negative electrode active material particles, is an average of 1 or more and 1.4 or less in a particle group of 5000 or more particles arbitrarily extracted from the negative electrode active material particles.

4. The negative electrode active material according to claim 1, wherein in the silicon compound particles, a half-value width (2θ) of a diffraction peak derived from a Si(111) crystal plane obtained from an X-ray-diffraction is 1.2° or more, and that a crystallite's size corresponding to this crystal plane is 7.5 nm or less.

5. The negative electrode active material according to claim 1, wherein the silicon compound particles satisfy a relationship A>B, in which A is a maximum peak strength value in a Si and a Li silicate regions given as a chemical shift value of −60 ppm to −95 ppm and B is a peak strength value in a $SiO_2$ region given as a chemical shift value of −96 ppm to −150 ppm, these values being obtained from a $^{29}$Si-MAS-NMR spectrum thereof.

6. The negative electrode active material according to claim 1, wherein a test cell is prepared which comprises a negative electrode, which includes a mixture of the negative electrode active material and a carbon-based active material, and a counter electrode lithium; in the test cell, charge in which a current is applied so as to insert lithium into the negative electrode active material and discharge in which a current is applied so as to release lithium from the negative electrode active material are executed for 30 times; and when a graph is drawn showing a relationship between a differential value dQ/dV, which is obtained by differentiating a discharge capacity Q in each charge and discharge with a voltage V of the negative electrode with a standard of the counter electrode lithium, and the voltage V, the voltage V of the negative electrode upon discharging on or after $X^{th}$ time (1≤X≤30) has a peak in a range of 0.40 V to 0.55 V.

7. The negative electrode active material according to claim 1, wherein the negative electrode active material particles have a median diameter of 1.0 μm or more and 15 μm or less.

8. The negative electrode active material according to claim 1, wherein the negative electrode active material particles include a carbon material on a surface portion thereof.

9. The negative electrode active material according to claim 8, wherein an average thickness of the carbon material is 10 nm or more and 5000 nm or less.

10. A mixed negative electrode active material, wherein the mixed negative electrode active material comprises the negative electrode active material according to claim 1 and a carbon-based active material.

11. A negative electrode for a non-aqueous electrolyte secondary battery, wherein the negative electrode contains the mixed negative electrode active material according to claim 10, and a ratio of the mass of the negative electrode active material to a total mass of the negative electrode active material and the carbon-based active material is 6% or more by mass.

12. A negative electrode for a non-aqueous electrolyte secondary battery, wherein the negative electrode comprises:
a negative electrode active material layer formed by the mixed negative electrode active material according to claim 10 and a negative electrode current collector; and
the negative electrode active material layer is formed on the negative electrode current collector, and
the negative electrode current collector includes carbon and sulfur with the contents of each being 100 ppm or less by mass.

13. A lithium ion secondary battery, wherein a negative electrode comprising the negative electrode active material according to claim 1 is used therein.

14. A method for producing a negative electrode active material, wherein the method is a method for producing a negative electrode active material comprising negative electrode active material particles which comprise silicon compound particles; the method comprising:
a step of forming negative electrode active material particles comprising silicon compound particles which comprise a silicon compound ($SiO_x$: 0.5≤x≤1.6);
a step of inserting Li into the negative electrode active material particles so as to include at least any one kind or more kinds of $Li_2SiO_3$ and $Li_4SiO_4$ therein;
a step of selecting, from the negative electrode active material particles, negative electrode active material particles having a loose bulk density BD of 0.5 g/cm$^3$ or more and 0.9 g/cm$^3$ or less, a tapped bulk density TD of 0.7 g/cm$^3$ or more and 1.2 g/cm$^3$ or less, and a compression degree of 25% or less, the compression degree being defined by (TD-BD)/TD, whereby producing the negative electrode active material by using the negative electrode active material particles thus selected.

15. A method for producing a lithium ion secondary battery, wherein a negative electrode is produced by using the negative electrode active material produced by the method for producing the negative electrode active material according to claim 14, and the lithium ion secondary battery is produced by using the negative electrode thus produced.

* * * * *